UNITED STATES PATENT OFFICE.

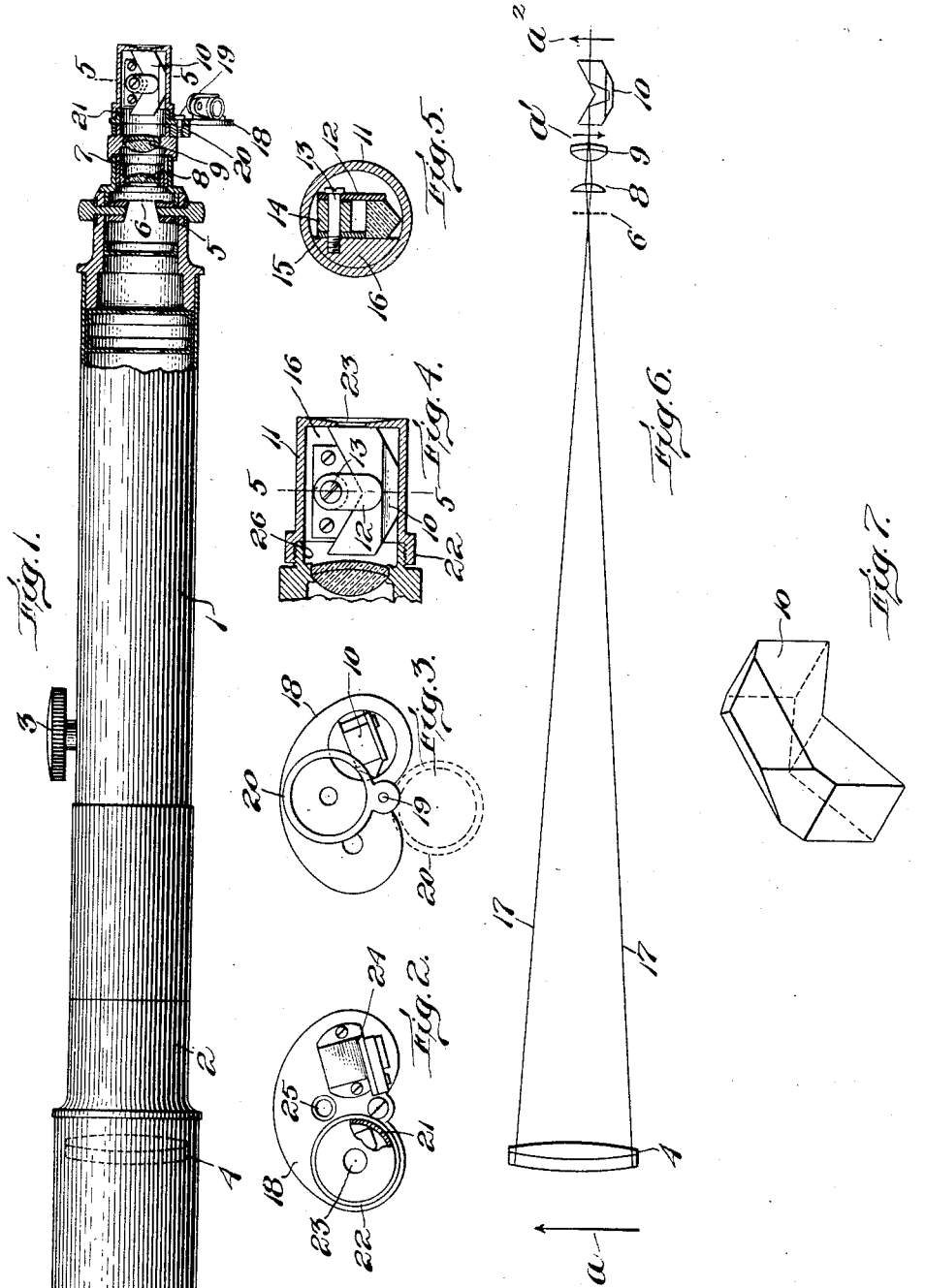

CHRISTIAN L. BERGER, OF BOSTON, MASSACHUSETTS.

ENGINEER'S TELESCOPE.

1,016,606. Specification of Letters Patent. Patented Feb. 6, 1912.

Application filed November 16, 1909. Serial No. 528,325.

*To all whom it may concern:*

Be it known that I, CHRISTIAN L. BERGER, a citizen of the United States, and resident of Boston, in the county of Suffolk and State of Massachusetts, have invented an Improvement in Engineers' Telescopes, of which the following description, in connection with the accompanying drawings, is a specification, like letters on the drawings representing like parts.

My invention relates to telescopes for use in engineers' and surveyors' transits, leveling instruments, and wherever telescopes are required for measuring or other scientific purpose, the object of my invention being so to combine, with the usual telescope, a reverting prism (preferably a Hensoldt or roof prism) as to see the image non-reversed and erect the same as seen by the naked eye without any danger of changing the line of collimation of the instrument. To insure that the line of collimation is not changed is of the utmost importance in a mathematical instrument, and it is also desirable to have the image reverted so that it is seen true and erect, and accordingly my object is to secure this result, maintaining the same accuracy, as to the line of collimation, that the telescope has when it is simply an inverting telescope, and yet making said telescope a reverting or erecting telescope, showing the image erect, so that my telescope transmits the same amount of light and has the same power as the ordinary inverting telescope. As compared with a usual erecting telescope of the same length, an erecting telescope made in accordance with my invention gives an increased amount of magnification.

An ordinary astronomical or engineering telescope consists of an achromatic object glass, cross-wires to establish the line of collimation, and an astronomical two-lens eye-piece, after Ramsden, Kellner, or Steinheil, all mounted in a tube provided with a slide and focusing arrangement. It is well known that this kind of telescope transmits a large amount of light and has great magnifying power, but inverts the image, and hence is not liked by engineers and those who have to read graduated rods, so that, to meet this objection, it has heretofore been the custom to provide instruments for this work with erecting telescopes in which the image is seen not inverted, said erecting telescopes requiring two additional lenses in the eye-piece by which the pencils of light from the object glass become erected. By the introduction of these two lenses, the light from the object glass becomes diminished from fifteen to twenty per cent., and also, in order that the telescope shall have the same length as the inverting telescope, the focal length thereof has to be materially shortened, thereby, in the same proportion, lessening the magnifying power of the telescope. The Hensoldt erecting telescope, provides a Hensoldt prism or roof prism between the object glass and the cross-wires directly in the line of collimation or path of the pencil of light which determines the line of collimation, said prism acting on the rays of light to revert or erect the image before it reaches the cross-wires and eye-piece, and thus introduces a chance for error in the line of collimation. Accordingly, my invention aims to secure in one and the same telescope all the advantages mentioned, viz. large transmission of light, large magnifying power, accuracy of collimation, with no possibility of interference therewith, and reverting or erecting of the image (*i. e.* inverting it back again the same as it actually is in nature).

To the above end, my invention consists of a telescope having the parts arranged in the following order, to wit, the object glass at the outer end of the telescope, then the cross-wires, with an unobstructed passage for the rays of light from the object glass directly to said cross-wires, an eye-piece containing the usual lenses, and, outside of the eye-piece, an inverting prism, preferably a Hensoldt or roof prism, said prism being preferably mounted removably on the outer end of the eye-piece.

Further features of construction and advantages thereof will appear more at length in the course of the following description, taken with reference to the accompanying drawings, in which I have shown a preferred embodiment of the invention.

In the drawings: Figure 1 is a conventional representation of a telescope constructed according to my invention; Figs. 2 and 3 are views in front elevation and rear elevation respectively of a preferred embodiment of my attachment; Fig. 4 is an enlarged central longitudinal sectional view showing in side elevation the reverting prism or lens and its holder shown in its relation to the eye-piece; Fig. 5 is an enlarged transverse sectional view on line 5—5, Figs. 1 and 4; Fig. 6 is a diagrammatic view illustrating the theory and operation of my invention; and Fig. 7 is a perspective view of the Hensoldt prism.

The telescope proper may be of any usual or preferred kind, comprising a tube or barrel 1 having an adjustable outer end 2 adjusted in usual manner by a focusing screw 3 and containing an object lens 4, the reticule being indicated at 5 carrying the cross-wires at 6, and beyond the latter is the eye-piece 7 comprising usual lenses 8, 9. Between this and the observer I secure by any suitable means a Hensoldt prism 10, herein shown as mounted for convenience in a tubular eye-piece 11 auxiliary to the regular eye-piece 7, being clamped therein by a heavy leaf spring 12, like a tongue or ear depending to overlap one side of the prism, and tightly clamped at its upper end by a clamping pivot or screw 13 against a block 14, said clamping pivot or screw passing through a plate 15 into a block or wall 16 against which the adjacent side of the prism 10 rests.

It will be understood that I have not attempted to show the various niceties and details of adjustment, mounting, etc., which in practice are employed in connection with the various parts thus far mentioned, inasmuch as my invention does not reside in these details, but resides broadly in the provision of the said inverting prism (for re-inverting the image) between the eye and the eye-piece of an otherwise inverting telescope. In other words, my invention resides in providing an inverting measuring telescope with a Hensoldt prism (or its equivalent) as an auxiliary eye-piece or portion of the telescope eye-piece, located between said telescope eye-piece and the eye of the observer; and does not reside in said prism itself, nor the means of securing it, nor in any of the details or minutiæ of construction which are herein necessarily mentioned, and to some extent shown, in order that the invention itself may be properly understood.

Referring to Fig. 6, it will be understood that when viewing an object $a$, the rays of light (conventionally indicated at 17) cause it to be inverted at $a'$, which is the usual point of observation or position of the eye of the observer. The roof prism or Hensoldt lens 10, however, inverts or erects the object, so that, when viewed at the right hand end of said prism, it is seen erect as indicated at $a^2$. This is accomplished without any possibility of affecting the accuracy of the instrument, inasmuch as the rays or pencils of light at the point $a'$, where they usually enter the eye, have become parallel. I take advantage of this fact by placing the Hensoldt prism just in front of the telescope eye-piece, i. e. between the latter and the eye of the observer where it is impossible for it to interfere in any way with the line of collimation, as it would if placed at any point between the object lens and the telescope eye-piece. Furthermore, by placing it externally of the telescope eye-piece, I am enabled to make it of a very small size, and hence practicable for field use. This small size is made possible because of the fact that the lines of light are not converging at this point but have been reduced to their final narrow area or section of parallel or non-divergent and non-convergent pencils of light, of proper area or extent to enter the pupil of the eye, and yet, notwithstanding the small size of the prism, it is ample, at this point, for properly and accurately erecting the image so that it is transmitted upright to the pupil of the eye. The surveyor or engineer has, therefore, the advantage of the well recognized superiority of the astronomical telescope, as to large amount of light and power, and at the same time he has the advantage of an erecting telescope. Notwithstanding that the instrument is an erecting telescope, he can commence work early in the morning and continue until late in the evening, on account of the superior light and power, although the telescope has the usual small size of a regular inverting telescope.

I prefer to mount the roof prism attachment or auxiliary erecting eye-piece 11 on a plate 18, to which is secured by a pivot 19 a ring 20 for screwing onto the outer end of the astronomical eye-piece 7, said plate having an externally threaded flange 21 for receiving the internally threaded end 22 of the roof prism eye-piece 11, so that, when the plate is turned on its ring 20 until the sight opening 23 is in axial alinement with the telescope proper, the roof prism will be in correct operative position. On the other end of the plate 18 is mounted a total reflecting prism 24 to rotate in usual manner for special service in sighting vertically (all as well known in connection with surveying instruments), and at 25 is a colored glass for use in viewing the sun or intense lights. Preferably also the astronomical or telescope eye-piece is provided with a flange 26 externally threaded to fit the flange 22, so that the roof prism eye-piece can be used either on the plate mounting shown in Fig. 3 or directly on the eye-piece. The plate mounting is preferred because it enables the operator to use the roof prism for erecting purposes, or to swing the plate around until it is entirely out of line with the telescope, or to use the total reflecting prism 24 when desired, or to swing the plate entirely out of the line of view, and sight through the ring 20 when in the dotted position, Fig. 3, when for any reason or whim of the user he prefers to use the telescope as an ordinary inverting telescope.

I have not entered into the details of construction and theory of the roof prism (shown in enlarged size in Fig. 7), as I employ the recognized roof prism made by Hensoldt of Germany, as previously stated, my invention residing in placing this prism next to the observer, i. e. directly in front of the astronomical eye-piece, as a part of said eye-piece, to all intents and purposes, as distinguished from placing said roof prism between those parts of the telescope which determine the line of collimation, i. e. between the object lens, cross-wires, and astronomical eye-piece. The result is that I eliminate the danger of changing the line of collimation of the telescope, thereby maintaining the telescope as accurate as ever, which is the most important matter in connection with a mathematical instrument, and yet I erect the image without sacrificing either light or power.

By my invention the telescope has substantially the same amount of light and the same power as the ordinary inverting telescope, and yet it is an erecting telescope, whereas erecting telescopes as heretofore made, when of the same length as an inverting telescope, have necessarily had a less amount of light and less power. Stated in another way, my invention maintains the absolute accuracy of the inverting telescope, and yet is an erecting telescope which secures an increased amount of magnification as compared with the same length of erecting telescope as previously constructed.

Having described my invention, what I claim as new, and desire to secure by Letters Patent is:

1. A measuring telescope, comprising an object lens and an ocular mounted in operative relation for producing a usual magnified inverted image, and a re-inverting prism of relatively small size mounted between said ocular and the eye of the observer in the optical axis for erecting the image inverted by said lenses.

2. The combination with a measuring telescope having an object lens and an ocular arranged to produce an inverted image, of a roof prism of relatively small size removably mounted on the ocular end of the telescope next to the eye of the observer for erecting the image, said roof prism extending in the optical axis.

3. A measuring telescope, comprising an object lens at its outer end, cross wires adjacent its inner end with an unobstructed passage for the rays of light from the object lens directly to said cross wires, an astronomical eye-piece back of said cross-wires adapted for coöperation with said object lens to produce an inverted image, and a roof prism back of said eye piece as an auxiliary part thereof next to the eye of the observer for erecting the image.

4. The combination with a measuring telescope and its lenses, having a projecting flange at the eye-piece end of the telescope, of an apertured plate provided with an eccentrically pivoted securing ring fitting said flange, and a roof prism removably secured to said plate, having a securing flange adapted also to fit said projecting flange of the telescope whereby said prism may be mounted at the will of the operator either on said plate or directly on the eye-piece end of the telescope.

5. The combination with a measuring telescope and its lenses, of a plate pivotally mounted eccentrically on the eye-piece end of the telescope, a roof prism mounted on said plate in position to be turned on said eccentric pivot into axial alinement with the telescope when desired, and a total reflecting prism also mounted on said plate in position to be turned on said eccentric pivot into axial alinement with the telescope when desired.

In testimony whereof, I have signed my name to this specification, in the presence of two subscribing witnesses.

CHRISTIAN L. BERGER.

Witnesses:
  M. J. SPALDING,
  EDWARD MAXWELL.